United States Patent Office 3,361,632
Patented Jan. 2, 1968

3,361,632
MEDICINAL PREPARATIONS HAVING A PROTRACTED ACTIVITY AND METHOD OF MAKING THEM
Gerhard Ross, Niederhofheim, Taunus, Walter Tillmann, Frankfurt am Main, and Reinhardt Liebenhoff, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed May 7, 1965, Ser. No. 454,192
Claims priority, application Germany, May 8, 1964, F 42,828
2 Claims. (Cl. 167—83)

The present invention relates to medicinal preparations having a protracted activity and a process for preparing them.

Various methods have already been described according to which medicinal preparations having a protracted activity can be produced (cf., for instance, Archiv. der Pharmazie, vol. 293/65 (1960), pages 766–785).

The known "encapsulating" process which provides individually encapsulating small balls or granules so that the active substance is released with delay, has, however, various drawbacks. For instance, by additionally compressing mixtures of small balls or granules provided with coatings of different strength, the coating may be destroyed. Furthermore, the coating of said small shaped bodies is usually processed in vessels for dragee production in an operation comprising several steps and requiring a long period of time. Since the shaped bodies are of very little weight, aggultinations may occur when the coatings are applied.

Now we have found a process for preparing said medicinal preparations having a protracted activity, which process comprises producing, from suspensions or solutions of active substances in liquid carriers, or distributions in liquids or gases in which the carrier substance is hardly soluble or insoluble, pearls differing from one another as to melting point and/or solubility of the carrier substances, mixing them and collecting them to dosage units.

For instance, the active substance is dissolved in a liquid carrier and dropped or sprayed through very fine nozzles into a solvent in which the carrier substance is not at all or only sparingly soluble. When operating in this way, nearly round bodies are formed which are removed from the solvent by filtration and then dried. It is likewise possible to drop the solution or a suspension of the active substance in a carrier substance at a temperature above the solidification point of the carrier substance into a gas, whereby the liquid solidifies to micro balls. Air, nitrogen, carbon dioxide or noble gases are useful as such gases.

The preparation of the micro balls must be adapted in each case to the special properties of the medicament to be encapsulated. Sparingly soluble active substances are, for instance, formed into drops with addition of surface active substances, softening agents, solvents and/or water-soluble auxiliary substances (such as sodium chloride) in order to attain a releasing mechanism in conformity with each individual active substance. As auxiliary agents for the initial active dose there are used, above all, substances capable of forming drops, soluble in water or in gastric juice. Instead of a solution of the medicament in the carrier substance, a suspension of the active substance in the carrier substance may likewise be used.

According to this method, separate operations are carried out for producing pearls containing the same active substance, but different carrier substances. These carrier substances differ from one another as regards solubility and melting points. As carrier substances, there are suitable, for instance, all hydrophobic substances such as fats, waxes, plastics, polymers, cellulose derivatives which are capable of forming drops and which release the admixed active substances only slowly. It is likewise possible to use carrier substances which are solid at room temperature, for instance certain fats or waxes, which, however, become liquid on being warmed, and which, in this way, can be formed to drops.

Of the various sorts of pearls thus produced certain amounts by weight are mixed at the ratio desired and these mixtures are combined, i.e. they are pressed to tablets which may likewise be cone-shaped or they are filled into capsules.

The advantage of the process of the present invention in contradistinction to methods hitherto applied for medicinal preparations having protracted activity is on the one hand, that the production of the pearls according to the drop method in comparison with the production of corresponding granules is a considerably simplified operation. On the other hand, it is of great advantage that according to the process of the present invention micro balls are obtained which, in contradistinction to those obtained by the known encapsulating method, are not provided with an easily injurable coating, but are uniformly distributed in the carrier substance.

The use of pearls instead of the hitherto used granules has the further advantage that the pressing into tablets does not cause any difficulties. Whereas the granules, when being compressed, easily crumble, the pearls used according to the present invention may be only plastically deformed.

Finally, the combination of pearls containing different carrier substances as attained in a very simple manner by the process of the present invention renders possible a protracted activity of the medicinal preparation precisely adapted to each individual requirement.

The following example serves to illustrate the invention without, however, limiting it thereto:

*Example*

(1) 0.1 gram of methylene blue is dissolved in 100 grams of polyglycol 6000 and dropped or sprayed through very fine nozzles into liquid paraffin. Nearly round bodies are formed having a diameter between 0.5 and 3 mm. After removal of the paraffin by filtration, they are degreased and dried.

(2) 0.1 gram of very finely ground methylene blue is suspended in 100 grams of paraffinum solidum, dropped or sprayed through fine nozzles into water. Nearly round bodies of a diameter between 0.5 and 3 mm. are formed which, after removal of the water by filtration, are dried.

(3) 0.1 gram of very finely ground methylene blue is suspended in 100 grams of cera alba and dropped or sprayed through fine noles into a mixture of ethyl alcohol and water. Nearly round bodies of a diameter between 0.5 and 3 mm. are obtained, which after removal of the collecting liquid by filtration are dried. Equal parts by weight of the shaped bodies (1), (2) and (3) are homogeneously mixed and filled into gelatine capsules. In-vitro tests in artificial gastric juice show that such a capsule releases in the course of 30 minutes one third of the methylene blue from the polyglycol pills, whereas the remainder of the methylene blue of the paraffin and wax phase is released after two hours in the gastric juice and after a further 8 hours continuously and quantitatively in the intestinal juice.

We claim:
1. A gelatin capsule filled with a given quantity of medicament, one-third of which is intended to be released within about thirty minutes in gastric fluid, a sec- ond third of which is intended to be released after about two hours in gastric fluid, and the remainder of which is intended to be released after about eight hours in intestinal fluid, said quantity of medicament being uniformly distributed in a homogeneous mixture of three equal parts by weight of nearly round pearl drops between 0.5 and 3 mm. in diameter, each having the medicament uniformly distributed therein; one-third of said pearl drops having been produced by dissolving one-third of the medicament in polyethylene glycol 6,000 to form a solution, dropping or spraying said solution through very fine nozzles into liquid paraffin, removing the paraffin by filtration, degreasing and drying; one-third of the pearl drops having been produced by suspending one-third of the medicament in paraffinum solidum, dropping or spraying the resulting suspension through fine nozzles into water, removing the water by filtration, and drying; and one-third of the pearl drops having been produced by suspending one-third of the drug in cera alba, dropping or spraying the resulting suspension through fine nozzles into a mixture of ethyl alcohol and water, removing this collecting fluid by filtration, and drying.

2. Compressed tablet comprised of a given quantity of medicament, one-third of which is intended to be released within about thirty minutes in gastric fluid, a second third of which is intended to be released after about two hours in gastric fluid, and the remainder of which is intended to be released after about eight hours in intestinal fluid, said quantity of medicament being uniformly distributed in a homogeneous mixture of three equal parts by weight of nearly round pearl drops between 0.5 and 3 mm. in diameter, which may be plasticly deformed upon being compressed, each pearl drop having the medicament uniformly distributed therein; one-third of said pearl drops having been produced by dissolving one-third of the medicament in polyethylene glycol 6,000 to form a solution, dropping or spraying said solution through very fine nozzles into liquid paraffin, removing the paraffin by filtration, degreasing and drying; one-third of the pearl drops having been produced by suspending one-third of the medicament in paraffinum solidum, dropping or spraying the resulting suspension through fine nozzles into water, removing the water by filtration, and drying; and one-third of the pearl drops having been produced by suspending one-third of the drug in cera alba, dropping or spraying the resulting suspension through fine nozzles into a mixture of ethyl alcohol and water, removing this collecting fluid by filtration, and drying.

References Cited

UNITED STATES PATENTS

| | | | |
|---|---|---|---|
| 3,092,553 | 6/1963 | Fisher et al. | 167—82 |
| 3,247,066 | 4/1966 | Milosovich | 167—82 |

LEWIS GOTTS, *Primary Examiner.*

S. K. ROSE, *Assistant Examiner.*